Jan. 8, 1929.
N. M. SMALL
1,698,567
VALVE
Filed Oct. 21, 1926
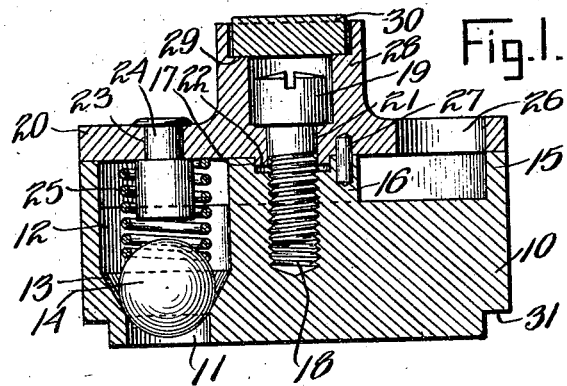
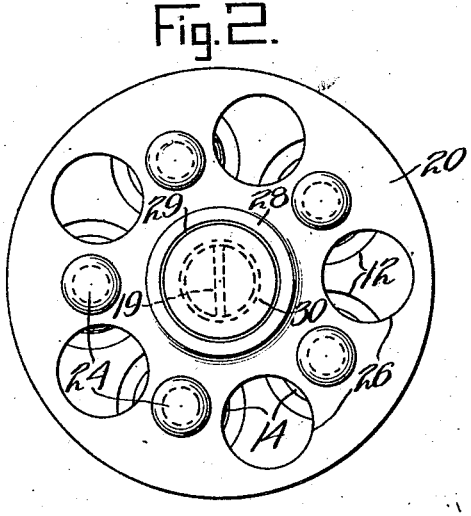 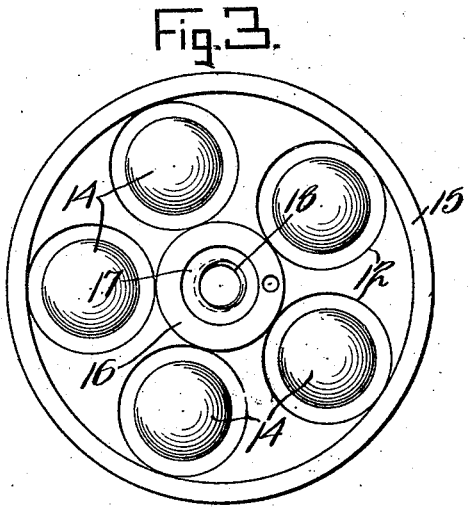
Inventor
Norman M. Small
Attorney Patented Jan. 8, 1929.

1,698,567

UNITED STATES PATENT OFFICE.

NORMAN M. SMALL, OF WAYNESBORO, PENNSYLVANIA, ASSIGNOR TO FRICK COMPANY, OF WAYNESBORO, PENNSYLVANIA, A CORPORATION OF PENNSYLVANIA.

VALVE.

Application filed October 21, 1926. Serial No. 143,226.

My said invention relates to valves and it is an object of the invention to provide a valve particularly adapted for use with refrigerating machines as a discharge valve but capable of being reversed and used as a suction valve.

Referring to the accompanying drawings which are made a part hereof and on which similar reference characters indicate similar parts, Figure 1 is a central transverse section of a valve illustrating my invention, Figure 2, a top plan view, and Figure 3, a bottom plan view.

In the drawings reference character 10 indicates a valve body provided with a plurality of circular openings 11, of any appropriate number, in its bottom portion with its top portion provided with concentric openings 12 of slightly larger diameter than the openings 11. The openings 11 and 12 are connected by an inclined wall 13 which forms a valve seat for a ball valve 14. The valve body 10 is provided on its upper surface with an upstanding marginal or peripheral flange 15 and a central hub 16 between which is formed an angular passageway for fluid. The hub 16 is preferably provided with a central concentric opening 17 in its upper side and with a smaller concentric opening 18 for the reception of a cap screw 19 adapted to hold a top plate or valve seat cover 20 on the body 10.

The top plate 20 is provided with central opening 21 for the reception of the cap screw 19 and a depending flange 22 is concentrically formed for engagement within the opening 17 for centering the top plate in position on the valve body. The top plate is provided with a plurality of openings 23 corresponding in number to the openings 11 and a spring guide pin 24 is secured in each of said openings with such guide pin projecting downwardly in close proximity to the ball valve 14, limiting the upper movement of such ball valve and at the same time centering a spring 25 which holds the ball valve on its seat. The top plate is also provided with spaced openings 26 for permitting the passage of the fluid into and through the valve body.

In order to hold the spring guide pin 24 in position over the ball valves 14, the valve body and top plate are preferably provided with openings for the reception of a dowel pin 27. The top plate 20 is preferably provided with a concentric upstanding flange 28 of a diameter slightly larger than the head of the cap screw 19 and such upstanding flange is provided with a shoulder 29 for the reception of a cap washer 30. The bottom edge of the valve body may be provided with an annular groove 31 for cooperation with a receiving body (not shown) and if desired, in order that the valve may be reversed for use as a suction valve the top plate 20 may be similarly grooved.

It will be obvious to those skilled in the art that various changes may be made in my device without departing from the spirit of my invention, and I, therefore, do not limit myself to what is shown in the drawings and described in the specification, but only as set forth in the appended claim.

Having thus fully described my invention, what I claim as new and desire to secure by Letters Patent, is:

The combination of a relatively thick valve body having a central upstanding hub, an upstanding flange about its outer edge forming an annular chamber between the same, said valve body being provided with a plurality of spaced transverse passages therethrough, the upper ends of said passages terminating in a chamber formed between the central hub and the flange about the outer edge of the body, a valve seat formed in each transverse passage, a ball-valve disposed in each passage for cooperation with the corresponding valve seat, a top plate fixed on said valve body, depending pins mounted on said top plate over said ball-valves, and springs disposed around said pins and confined between the top plate and the valves for holding the valves on their seats, said pins being adapted to limit the upward movement of the valves, substantially as set forth.

In witness whereof, I have hereunto set my hand and seal at Waynesboro, Pennsylvania, this 19th day of October, A. D. nineteen hundred and twenty-six.

NORMAN M. SMALL.